US006271786B1

(12) United States Patent
Huff et al.

(10) Patent No.: US 6,271,786 B1
(45) Date of Patent: Aug. 7, 2001

(54) RANDOM NOISE RADAR TARGET DETECTION DEVICE

(75) Inventors: Jimmie D. Huff, Claremont; Alexander Niechayev, Riverside, both of CA (US)

(73) Assignee: Raytheon Company, El Segundo, CA (US)

( * ) Notice: Subject to any disclaimer, the term of this patent is extended or adjusted under 35 U.S.C. 154(b) by 0 days.

(21) Appl. No.: 09/326,829

(22) Filed: Jun. 7, 1999

(51) Int. Cl.[7] .................................................. G01S 7/36
(52) U.S. Cl. .............................................................. 342/16
(58) Field of Search ................................. 342/16, 17, 18, 342/62, 68, 109, 145

(56) References Cited

U.S. PATENT DOCUMENTS 5,291,202 * 3/1994 McClintock ............................ 342/16
6,121,915 * 9/2000 Cooper et al. ......................... 342/70

\* cited by examiner

Primary Examiner—Daniel T. Pihulic
(74) Attorney, Agent, or Firm—Harness, Dickey & Pierce, P.L.C.

(57) ABSTRACT

A radar system (10) which transmits a random noise signal. The transmitted signal is embodied as an electromagnetic signal and is directed at an object or target. The object or target reflects at least a portion of the electromagnetic signal which is returned to the radar system. An image of the electromagnetic random noise signal is stored in memory (16) and compared with the returned modulated signal. Based on the correlation value, a determination is made regarding the object or target. In a particular implementation, the radar system is used in a target detection device (TDD) (10) in order to determine the distance from the target or object to the device and the relative velocity of the target or object and the device. When the target or object reaches a predetermined distance and also satisfies any other system requirements, the TDD (10) initiates a detonation signal which causes detonation of the missile or warhead.

7 Claims, 2 Drawing Sheets

RANDOM NOISE RADAR TARGET DETECTION DEVICE

TECHNICAL DESCRIPTION

This invention relates generally to the use of random noise in a radar system and, more particularly, to the use of random noise in a radar system to modulate a radio frequency carrier of a Target Detection Device (TDD), sometimes called a fuze, for the purpose of countering a digital radio frequency memory (DRFM) jammer or similar device that attempts to defeat the operation of the TDD.

BACKGROUND OF THE INVENTION

In a typical radar system, a radar antenna radiates a signal in the direction of an object which is the subject of the radar inquiry. A portion of this energy is reflected from the object back toward the radar system which receives and processes this reflected energy to extract information regarding the object. For example, in relatively simple systems, the relative velocity between the object and the radar system can be determined in accordance with the Doppler shift between emission and return of the signal. In more complex radar systems, signal processing techniques performed on the reflected signal may yield data regarding the size, shape, range, and direction of the object.

In some radar applications, the object may carry radar jamming systems which detect the emitted signal, modify it in one or more ways known to those skilled in the art, and retransmit the modified signal so as to deceive the radar system. A radar signal that is deterministic and periodically repeats, is more vulnerable to deceptive jamming than one that never repeats in time.

For example, a Target Detection Device (TDD), sometimes referred to as a fuze, is commonly found in a guided missile. Many TDD determine the distance between the missile and the target, and when the missile reaches a predetermined distance to the target, the TDD detonates the missile warhead to achieve maximum impact on the target. In such applications, the targets may be equipped with radar jamming systems such as digital radio frequency memory systems (DRFMs) which store the incoming radar signal in memory and determine the repeat interval of the signal. The DRFM then emits a signal replicating the return signal expected by the radar system back to the TDD. The signal emitted by the DRFM is delayed to apparently arrive before the reflected signal would normally arrive for the given distance between the radar system and the DRFM. This signal deceives the radar system into determining that the object is closer than it actually is.

Existing TDDs use repetitive waveforms to enable range determination. One example of waveform modulation is a pseudo-random noise sequence. In the pseudo-random noise sequence, the radar system emits binary sequences characteristic of a noise waveform, but which is repeated after a predetermined time interval. Another modulation format is frequency modulation continuous wave (FMCW), also referred to as swept-frequency or chirp waveforms. Yet another modulation format is medium pulse repetition rate. In a medium pulse repetition rate radar, the transmit waveform modulation is a train of pulses, and the range to an object is determined by the delay between transmission and reception of the pulse.

The above-described waveforms are deterministic. The deterministic characteristic enables intelligent targets that carry repeater jammers to store the TDD signal, delay it beyond the period where the signal repeats itself, and retransmit the delayed signal back toward the TDD delayed so that the target appears closer to the TDD than it actually is. The TDD in such instances typically detonates the missile warhead at a range beyond the lethal radius of the weapon.

One particular radar system employs TDDs having multiple radio frequency phases. For example, in one multiple radio-frequency phase missile application, a 255-bit or 511-bit, maximal-length sequence, pseudo-random waveform modulation is used to detect the range from the missile to the target. This pseudo-random code bi-phase modulates the radio frequency (RF) carrier. The modulation of the signal returned from the target is correlated with delayed images of the originally emitted code. A correlation occurs when the delay is equivalent to twice the target range. Samples of the correlated output are then processed by standard signal processing techniques so that the target is detected.

For example, assume an approximate signal propagation velocity of one foot per nanosecond and a straight line two-way travel path. If the time delay of a single bit of the code modulation is ten nanoseconds (ns) then a delay of one bit in the returned signal would indicate a distance to the target of five feet. Similarly, five bits or 50 nanoseconds of delay indicates a range of 25 feet, and a 255-bit delay indicates a range of 1275 feet. This range for a 255-bit, 1275 feet, is called the unambiguous range. Delays beyond 255-bits fall into an ambiguous range. For example, a delay of 256-bits indicates a range of 5 feet because the periodic nature of the 255-bit code. Thus, if a radar jammer can store the repetitive waveform, amplify it, and transmit the waveform back with the proper delay, the target carrying the jammer can be made to look closer in range than it actually is.

Thus, it is an object of the present invention to provide a radar system which emits a random electromagnetic signal at a target in order to provide information regarding the target.

It is a further object of the present invention to provide a radar system which receives a random, electromagnetic signal returned from an object illuminated with a random, electromagnetic signal emitted by the radar system, and provides information about the object.

It is yet a further object of the present invention to provide a radar system which emits an electromagnetic signal modulated by random noise in the direction of a target and receives a reflected electromagnetic signal returned from the object and determine the distance to the object.

It is yet a further object of the present invention to provide a Target Detection Device (TDD), sometimes called a fuze, which uses an electromagnetic signal modulated by random noise directed at an object and receives a reflected electromagnetic signal returned from the object in order to determines the distance to the object.

It is yet a further object of the present invention to provide a Target Detector Device which uses an electromagnetic signal including or modulated by random noise directed at an object and receives a reflected electromagnetic signal returned from the object in order to determine the distance to the object and further determine the velocity of the object relative to the radar.

It is yet a further object of the present invention to provide a Target Detection Device which uses an electromagnetic signal consisting of or modulated by random noise directed at an object and receives a reflected electromagnetic signal returned from the object in order to provide a distance to the object, the velocity of the object relative to the radar and further generate control commands in accordance with the distance and velocity of the object.

SUMMARY OF THE INVENTION

In accordance with the teachings of the present invention, this invention is directed to a Target Detection Device (TDD), sometimes called a fuze, for determining the distance to an object. The Target Detection Device includes a source of random noise for modulating an electromagnetic signal that is emitted in the direction of the object, where the object reflects back at least a portion of the electromagnetic signal. A receiver detects the random, electromagnetic signal returned from the object. A correlation processor then cross correlates the modulation on the emitted electromagnetic signal with the modulation on the returned electromagnetic signal. A signal processor receives the outputs from the correlation processor and determines the distance to the object and its velocity relative to the TDD.

Additional objects, features and advantages of the present invention will become apparent from the following description and the appended claims, taken in connection with the accompanying drawings.

DETAILED DESCRIPTION OF THE INVENTION

Figure 1:
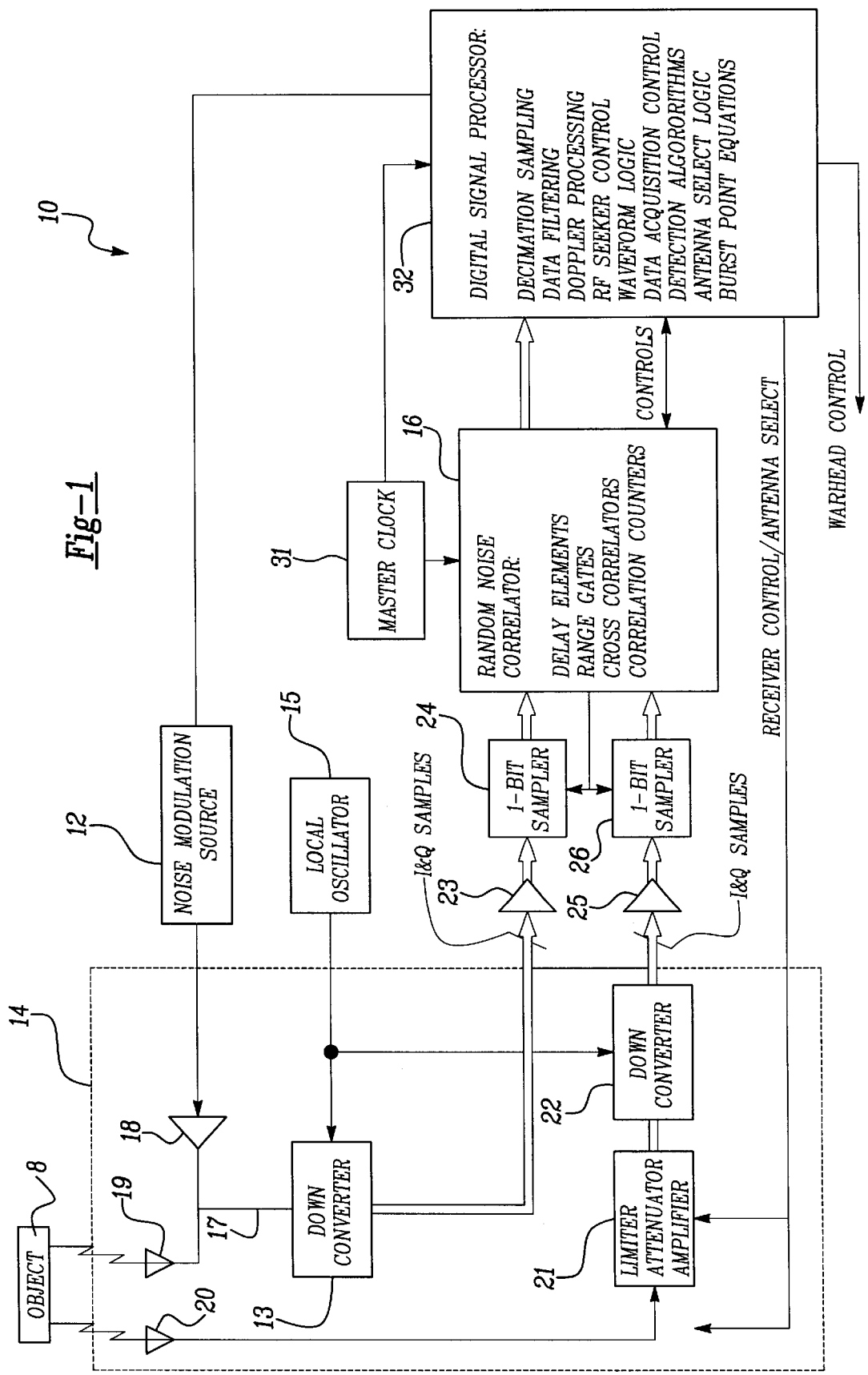
FIG. 1 is a block diagram of the radar system arranged in accordance with the principles of the present invention.

FIG. 1 is a block diagram of an exemplary Target Detection Device (TDD), also referred to as a fuze, arranged in accordance with the principles of the present invention. The TDD 10 includes a random noise modulation source 12 which generates a purely random noise signal with a bandwidth that is determined by the system range resolution requirements. For example, a bandwidth of 125 MHz will enable system range gates having a width of approximately four feet along the line of sight from the TDD 10 to the object to be interrogated by the TDD 10. The noise generated by noise modulation source 12 is centered at the system transmit frequency and can be generated by several methods known to those skilled in the art. Noise modulation source 12 also includes a switch that can be used to switch the noise-modulated signal on and off in pulsed-noise operation. The random noise signal is passed to the transmit/receive system 14, commonly referred to as a radio frequency (RF) seeker head system, where it is amplified and transmitted via one or more transmit antennas 19. A portion of the transmit signal is coupled by way of a coupler 17 to a down converter 13. Down converter 13 is driven by a local oscillator 15, which is centered at the transmit frequency. Inphase and Quadrature (I & Q) components of the down-converted random transmit signal are amplified to the required level in video amplifier 23 and then output to 1-bit samplers (comparators) 24. The sampled outputs of the samplers 24 are passed to random noise correlator 16. I & Q processing provides both magnitude and sense (incoming or outgoing) of the velocities of objects in the radar field of view. The use of I & Q processing is well understood by those skilled in the art of digital signal processing.

Transmit/receive system 14 also includes one or more receiving antennas 20 to detect the return signal reflected from the pre-selected object 8. Random noise transmit/receive system 14 includes a homodyne receiver that consists of a limiter-attenuator-amplifier network 21 for this exemplary TDD. The output of limiter-attenuator-amplifier network 21 is passed to a down converter 22 that is also driven by the local oscillator 15. I & Q components of the down-converted received signal are amplified to the required level in video amplifier 25 and then output to 1-bit samplers 26. The sampled outputs of the samplers 26 are passed to a random noise correlator 16. As will be understood by one skilled in the art, sampling devices that quantize the random modulation by more than one bit could also be used to provide enhanced performance.

In the embodiment of FIG. 1, one-bit samplers 24, 26 comprise single-bit A/D converters. The respective gain values of the video amplifiers 23, 25 in front of single-bit samplers 24, 26 are set such that the inputs to the samplers 24, 26 are hard limited on system noise. Although it may be thought that single-bit sampling would result in a serious reduction in system sensitivity, it can be shown that the overall loss of sensitivity of the random noise TDD system 10 is less than 3 dB due to hard-limiting and due to use of a fixed detection threshold in detection algorithms employed in the digital signal processor 32 rather than a conventional variable-threshold, constant false alarm rate detector with its inherent loss as is normally required in a detection system.

In random noise correlator 16, samples of the transmitted random noise modulation signal are passed through a series of one-bit delay elements. The number of delay elements is predetermined in accordance with the number of range gates, to be described herein, required for a particular application. For example, a specific application may employ 15 range gates per channel, which would require 14 delay elements. The delayed images of the transmitted random noise modulation signal are cross correlated with the modulation samples from the signal return signal. Thus, the detection process performed in random noise correlator 16 is coherent upon reception even though the transmit signal is random. The range gate output of the random noise correlator 16 for each unit of delay (range gate) of interest is passed to the digital signal processor 32 where it is processed using well-known signal processing techniques to find the range and closing velocity (Doppler frequency) of objects in the field of view. Digital signal processor 32 also performs additional operations on the cross correlated range-gate data out of the random noise correlator 16 such as decimation sampling and filtering on the input data, detection thresholding, RF seeker control, data acquisition control, antenna select control, noise modulation source waveforem generation, and burst point or destination point calculations. Digital signal processor 32 outputs a control command to the detonation device of the missile. Digital signal processor 32 also outputs control commands to transmit/receive system 14. A master clock 31 synchronizes operation of the random noise correlator 16 and the digital signal processor 32.

Figure 2:
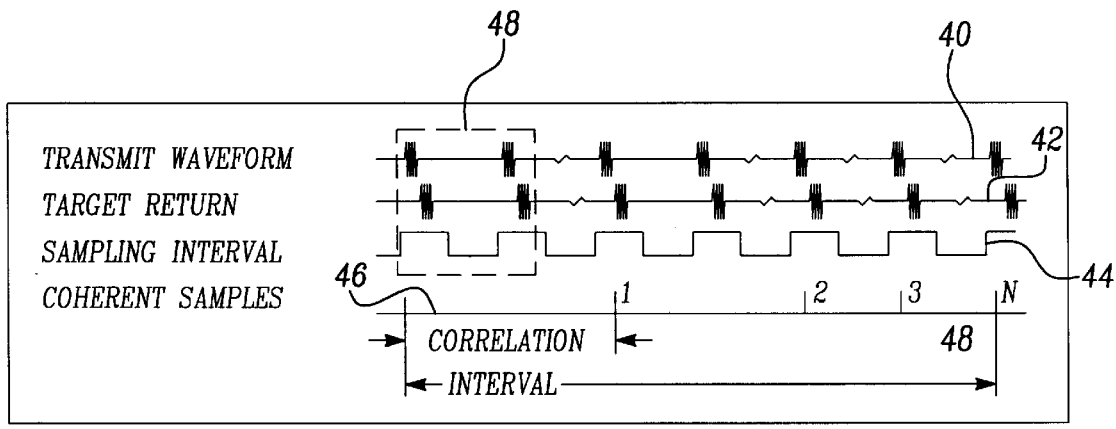
FIG. 2 is a diagram of the input and output waveforms for the system of FIG. 1.

Of particular interest in this invention is the use of random noise source 12 to generate a random noise signal that is centered at the system operating frequency. This signal is then emitted by transmit/receive system 14. The random noise defeats systems which search for repetition in the emitted signal, attempt to copy the emitted signal, and transmit it back to the antenna system 14 with a delay which causes the object to appear closer than it actually is. FIG. 2 graphically illustrates the transmission, return, and processing of waveforms to implement the present invention.

Referring to FIG. 2, a purely random noise signal is generated and, as described in FIG. 1, is passed to transmit/receive system 14 and also sampled and input to random noise correlator 16, which saves a replica of the transmit random noise signal. The randomly generated noise signal 40 is output by the transmit/receive system 14. As shown in FIG. 2, transmit waveform 40 is pulsed because of the relatively close proximity of the transmit and receive antennas in some radar applications and most TDD applications. The pulsed transmit waveform significantly reduces coupling of the transmit signal back into the receive antenna and accompanying RF receiver. This coupling is typically referred to as leakage. The pulsed signal arrangement alleviates the need to address the difficult task of providing sufficient isolation between the transmit and receive channels so that the return signal is of sufficiently greater power than the leakage. This is particularly applicable where the apparent radar cross-section of the object 8 is relatively small. Consequently, the input receiver of antenna system 14 is gated off during the transmit time. As is known in the art, the exact parameters for pulsing the transmit waveform 40, such as duty cycle and repetition frequency, are adjusted to minimize detection desensitization due to clutter in a high-clutter environment.

The transmit waveform 40 strikes an object or target 8 and is reflected back as the target return signal or waveform 42. A sampling interval 44 defines the period for transmitting the transmit waveform 40 and varies in accordance with the particular application. Further, a predetermined number of sampling intervals 44 define a correlation interval 46, and a predetermined number of correlation intervals 46 define a coherent processing interval 48. The correlation interval 46 and the coherent processing interval 48 are each selected in accordance with the particular radar application, as will be understood by one skilled in the art.

Figure 3:
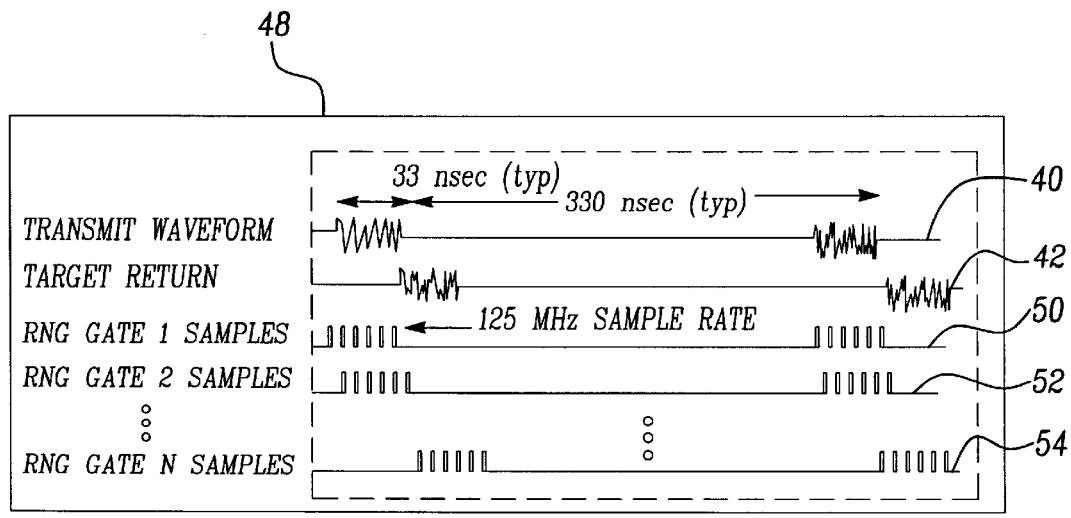
FIG. 3 is a diagram of the waveforms for one sample period of the waveforms of FIG. 2.

FIG. 3 depicts an expanded view of block 48 of FIG. 2. FIG. 3 includes the transmit waveform 40, the target return waveform 42, and a number of range gate sampling waveforms 50, 52, and 54. Range gate sampling waveforms 50, 52, and 54 define waveforms for sampling the emitted and return signal for correlation by RNR ASIC 16. Each range gate sampling waveform 50, 52, and 54 corresponds to the paired (I & Q) complex outputs of a unique cross correlation range gate channel in the random noise correlator.

The target return signal 42 is typically sampled in I & Q at a rate for each approximately equal to the bandwidth of the transmitted noise, 125 megahertz (MHz), for example. The samples for the earliest range gate waveform, range gate 1 sampling waveform 50, for example, commences at the start of transmit waveform 40. Samples for the next range gate sampling waveform, range gate 2 sampling waveform 52, are delayed by one sampling period which is the reciprocal of the sampling frequency. Thus, the range gate width is effectively equal to the two-way travel time of the transmit pulse of one sample. The range gate width is approximately four feet for the range gates of FIG. 3 for this exemplary implementation. The total number of range gates vary in accordance with the operational range for a given radar system or TDD 10.

If the target return waveform 42 overlaps the transmit waveform 40, the receiver is typically gated off, and the return power as seen by any range gates during this receiver-off interval will be eclipsed. In normal TDD applications, this does not occur because the target detection process is desensitized at close range to prevent mistaken identity of targets smaller than the intended target. In radar environments where interference such as clutter is minimized or where the target return waveform power sufficiently exceeds the antenna leakage power, the duty cycle of the random noise may be increased to 100%.

The example depicted in FIGS. 2–3 employs single-bit sampling in order to enable high-speed sampling, thereby eliminating the need for high-speed analog to digital conversions. This effectively causes a loss in detection capability as would be provided by multiple-bit signal quantization of less than three decibels if the receiver gain is selected so that thermal noise saturates the receiver. Thus, with the system saturated by thermal noise, the noise/interference floor during signal processing is fixed. Therefore, a fixed threshold can be used for detection, thereby eliminating the normal loss associated with a constant false alarm rate detector.

In addition, with single-bit sampling, XOR gates can be used as the complex multiplier to cross-correlate the target return waveform samples with the delayed image of the random noise waveform samples. The range counters in the random noise correlator 16 count the number of correlations over the correlation interval. At the end of a correlation interval 46, the counter value for each range gate 50, 52, and 54 passes to the digital signal processor 32 (of FIG. 1), and the range gate counters in the random noise correlator 16 (of FIG. 1 ) are reset to initiate another correlation interval.

After N correlation intervals, defined as a coherent processing interval 48, the digital signal processor 32 can coherently process the end values output by each range gate counter in the random noise correlator 16 using standard range-Doppler signal processing techniques well known in the art. The post processing occurring in digital signal processor 32 occurs at a relatively low processing frequency relative to the computational through-put rate. A special GaAs ASIC chip that controls the noise correlator processing has been designed to operate at sampling rates in excess of 1.5 GHz. For lower-speed system requirements, many other technologies can accomplish the same task.

Using this process, any coherent or incoherent out-of-range signal is distributed uniformly during Doppler processing occurring in digital signal processor 32. Detection is thus limited to the product of the noise sampling bandwidth (B) and the length (T) of the coherent processing interval 48 to define a time-bandwidth (TB) product of the processing. Further, in order to detect a signal, the magnitude S of the signal at the output of the digital signal processor must exceed the power of the noise/interference N minus the time-bandwidth (TB) plus the required detection threshold (Th). That is, in order for a signal to be detected, $$S>(N-TB+Th),$$

where S is the magnitude of the signal in dB;

N is the power of the noise/interference in dB;

TB is the time-bandwidth product in dB; and

Th is a required detection threshold in dB. This time-bandwidth detection requirement is well understood by one skilled in the art.

From the foregoing, it can be seen that this invention provides a radar detection system which uses random noise to modulate a carrier signal emitted by the radar in the direction of a target. A particular advantage of this invention is that the random noise signal does not repeat so that the target cannot copy the signal and relay the signal back to the radar system with an apparent delay less than the true delay.

Although the invention has been described with particular reference to certain preferred embodiments thereof, variations and modifications can be effected within the spirit and scope of the following claims.

What is claimed is:

1. A Target Detection Device (TDD), sometimes called a fuze, for determining the distance to an object and the object's velocity, the TDD being capable of defeating a digital radio frequency memory (DRFM) jammer or similar device from causing the TDD to prefunction, thus producing mission failure for the system employing the TDD, the Target Detection Device comprising:

a source of random noise for modulating a radio frequency (RF) carrier of a transmitter for transmitting a random, electromagnetic signal in the direction of the object, the object reflecting back at least a portion of the electromagnetic signal;

an antenna and receiver for receiving and amplifying the random, electromagnetic signal returned from the object, the returned signal being a delayed replica of the transmitted signal;

a correlation processor for correlating the random noise modulation on the transmitted electromagnetic signal with the random noise modulation on the returned electromagnetic signal, the correlation processor generating an output; and a signal processor for post-processing the output from the correlation processor and determining the distance to the object, the relative velocity between the object and the TDD, the signal processor generating control commands to defeat the DRFM.

2. The Target Detection Device of claim 1 wherein the correlation processor is an application specific integrated circuit (ASIC).

3. The Target Detection Device of claim 1 further comprising a second signal processor for generating second control commands in accordance with the distance to the object, and the velocity of the object relative to the TDD.

4. The Target Detection Device of claim 1 wherein the signal processor determines the Doppler shift of the transmitted signal versus the received electromagnetic signal, the Doppler shift varying in accordance with the relative velocity between the object and the TDD.

5. The Target Detection Device of claim 1 wherein the antenna also emits electromagnetic signals.

6. The Target Detection Device of claim 1 further comprising a transmitter for generating an RF signal that is modulated by the random noise modulation signal.

7. The Target Detection Device of claim 1 wherein the correlation processor is an application specific integrated circuit (ASIC), further comprising:

a plurality of delay elements to generate a series of range gates for processing the returned electromagnetic signal;

a plurality of correlation elements for crosscorrelating the modulation on the transmitted and returned electromagnetic signals to determine a match between the two signals to indicate the range between TDD and the object; and a plurality of counters counting the matches between the modulation on transmitted and returned random electromagnetic signals to define a measure of the crosscorrelation.

* * * * *